April 7, 1936. A. Y. DODGE 2,036,464
LUBRICATING DEVICE
Filed Feb. 24, 1932 3 Sheets-Sheet 1
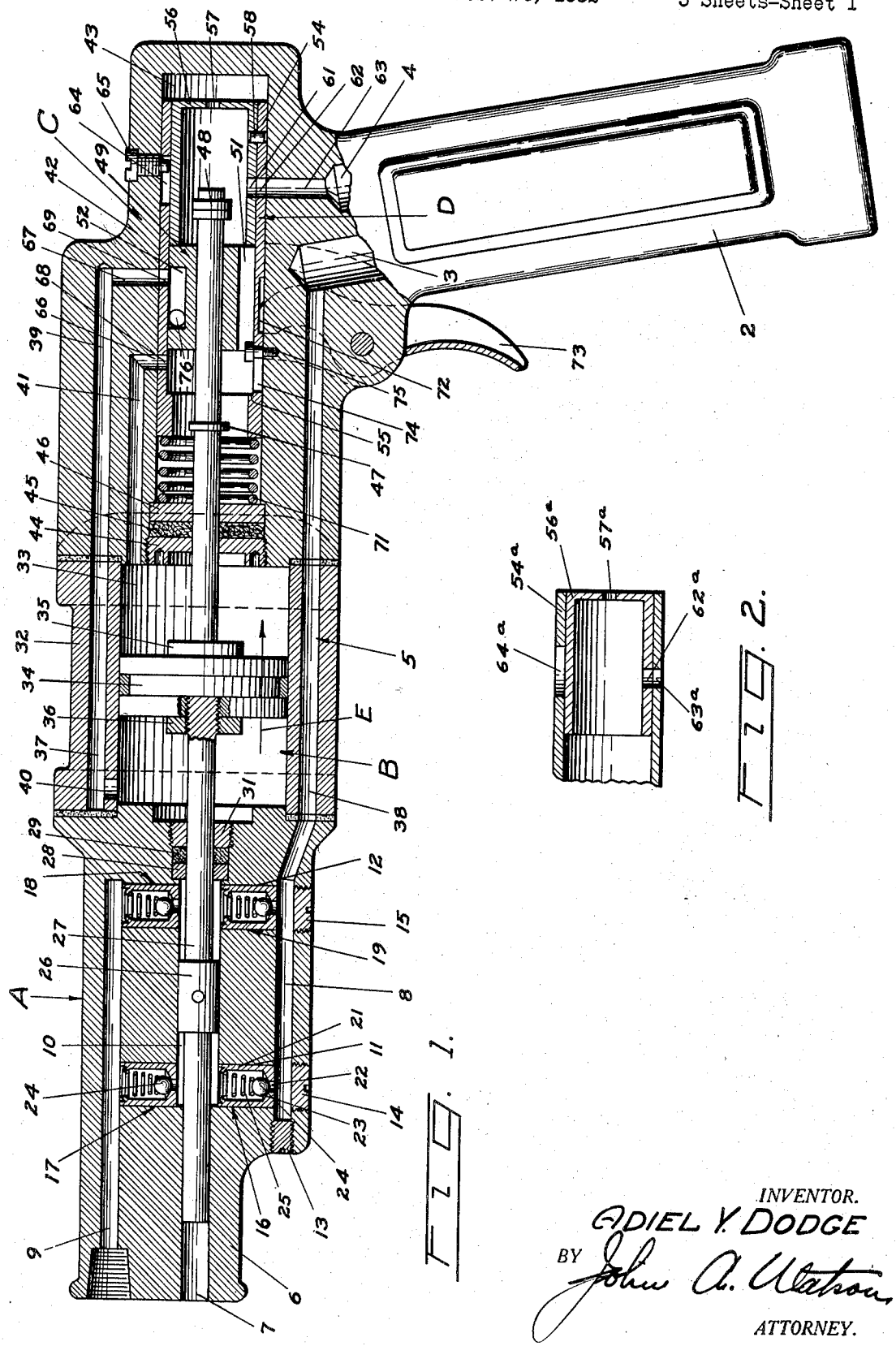
INVENTOR.
ADIEL Y. DODGE
BY John A. Watson
ATTORNEY.

April 7, 1936.  A. Y. DODGE  2,036,464
LUBRICATING DEVICE
Filed Feb. 24, 1932  3 Sheets-Sheet 2

INVENTOR.
ADIEL Y. DODGE
BY John A. Watson
ATTORNEY.

April 7, 1936.  A. Y. DODGE  2,036,464
LUBRICATING DEVICE
Filed Feb. 24, 1932  3 Sheets-Sheet 3
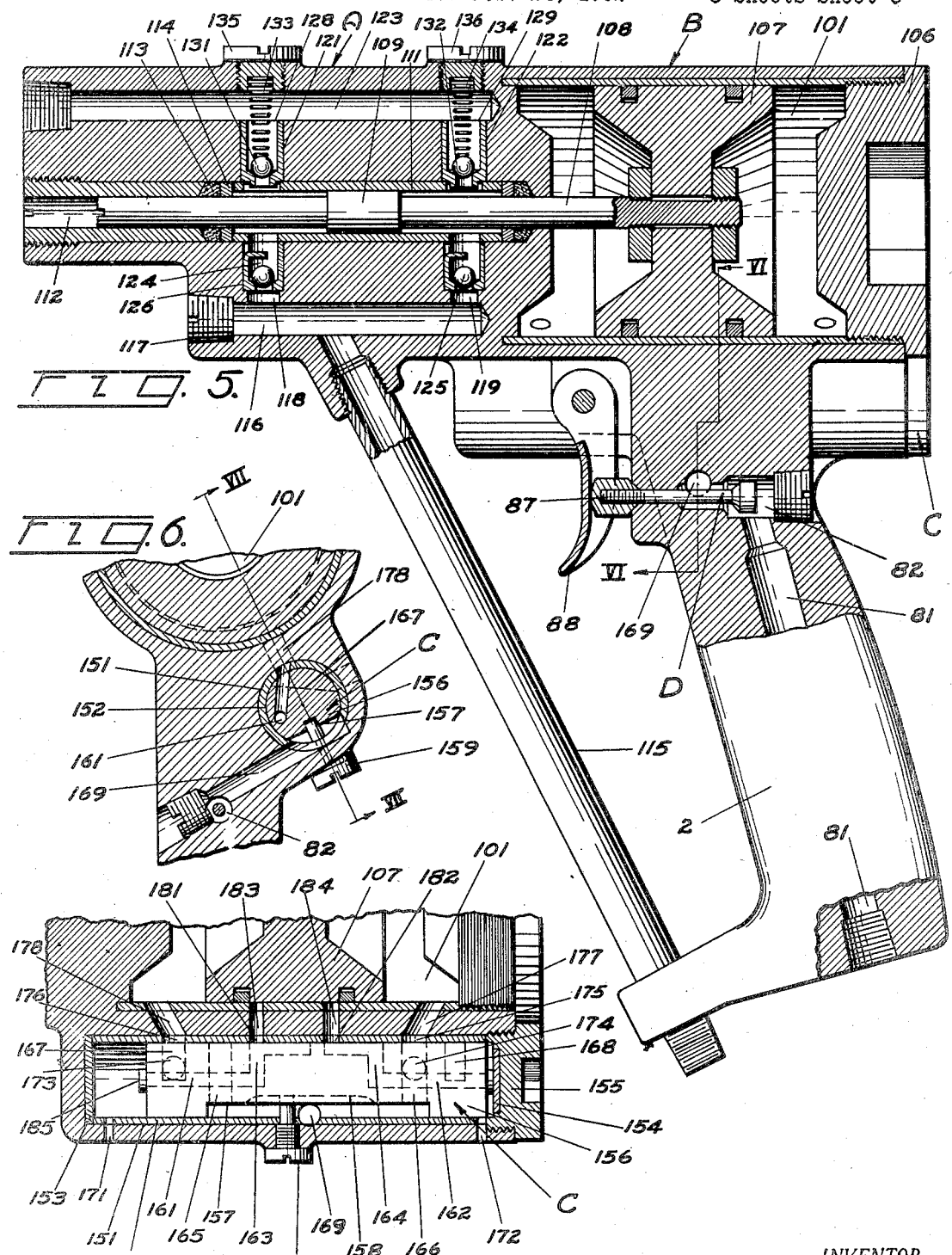

Patented Apr. 7, 1936

2,036,464

UNITED STATES PATENT OFFICE 2,036,464

LUBRICATING DEVICE

Adiel Y. Dodge, South Bend, Ind., assignor to The Lubrication Corporation, South Bend, Ind., a corporation of Delaware Application February 24, 1932, Serial No. 594,822

11 Claims. (Cl. 221—47.3)

This invention relates to lubrication devices, and more particularly to air operated lubricant guns or pumps by which lubricant may be continuously supplied, under relatively high pressure, to bearings and parts which are to be lubricated.

One of the objects of the invention is to provide an improved air operated lubricant gun.

Another object is to provide an air operated lubricant gun having a double acting pressure piston for supplying the lubricant under pressure during both its forward and rearward stroke, whereby the lubricant output is double that of the common type of single action lubricant gun, of substantially the same weight and dimensions.

Another object is to provide in an air operated lubricant gun of the air motor type, a novel automatic motor piston actuating valve.

Another object is to provide in an air operated lubricant gun a trigger operated throttle valve whereby the rate of lubricant delivery may be controlled by the operator.

Another object is to provide a lubricant gun of the type described in which a continuous supply of lubricant under pressure is fed therefrom as long as the trigger is depressed.

A further object is to provide, in an air operated lubricant gun, a compact and relatively light assembly which may be easily handled and controlled.

Other objects, and advantages, and uses of the invention, will be, or should become, apparent after reading the following description and claims and after consideration of the accompanying drawings forming a part of this specification, in which:

Fig. 1 is a sectional view of an air operated lubricant gun illustrating an embodiment of my invention.

Fig. 2 is a sectional view of a modified detail of the gun shown in Fig. 1;

Fig. 5 is a sectional view of another form of air operated lubricant gun;

Fig. 6 is a sectional view taken substantially on the line VI—VI of Fig. 5; and

Fig. 7 is a sectional view taken substantially on the line VII—VII of Fig. 6.

Figures 3, 4:
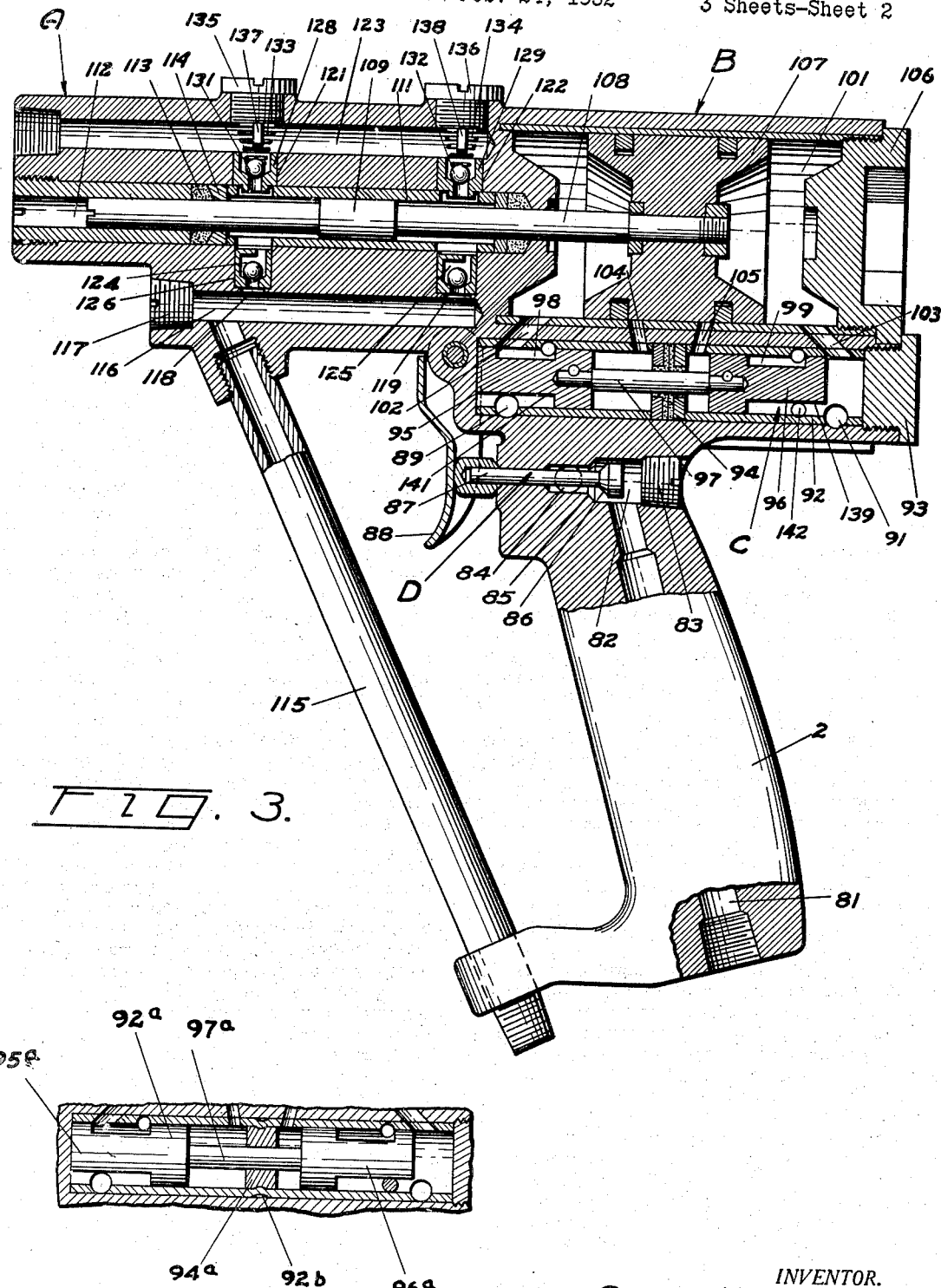
Fig. 3 is a sectional view of a modified form of air operated lubricant gun.
Fig. 4 is a sectional view of a modified form of the air valve shown in Fig. 3.

Referring to the drawings, it will be seen that each of the lubricant guns illustrated comprise a lubricant pump A, an air motor B for operating the pump, a control valve C for automatically controlling the air motor, and a manually controlled valve D by which the motor may be stopped and started.

Referring specifically to Fig. 1 of the drawings, I have shown a lubricating gun provided with a handle 2, through which are formed bores 3 and 4. The bore 3 is connected with a source of lubricant under relatively low pressure, and the bore 4 is connected with a source of air or other fluid under high pressure. Connected to the inner end of the bore 3, and extending forwardly of the gun, is a lubricant passage 5 leading forward to the pump section A of the gun.

The pump section A comprises a substantially cylindrical member 6 formed with, substantially central, intercommunicating longitudinal bores 7 and 10. Other and separate longitudinal bores 8 and 9 are formed in the member 6 parallel to the bores 7—10. The bore 8 forms a part of the lubricant passage 5 and is connected with a pair of transverse bores 11 and 12 with the bores 9 and 10. Plugs 13, 14, and 15 are provided for closing the outer ends of bores 8, 11, and 12. Inserted in the bores 11 and 12, are four valve assemblies 16, 17, 18, and 19. One of these assemblies is provided in each transverse bore intermediate the longitudinal bores 8 and 10, and one in each transverse bore intermediate the longitudinal bores 9 and 10.

Each of these valve assemblies 16, 17, 18, and 19 comprises a cage 21 having an inlet opening 22 and a valve seat 23, on which, rests a ball check valve 24 normally maintained on the seat by a spring 25. Each valve assembly thus forms a one-way check valve allowing lubricant to flow from the bore 8 to the bore 10, and from the bore 10 to the bore 9, but preventing the flow of lubricant from the bore 9 to the bore 10, and from the bore 10 to the bore 8.

A piston 26 is positioned in the bore 10 and is secured to a plunger rod 27 in any suitable manner. The forward end of the rod 27 extends into the bore 7 and prevents lubricant from passing forward in said bore. The rearward end of the rod 27 extends through suitable packing such as 28 and 29, and through a packing plug 31 into the cylinder of the air motor B of the lubricating gun.

Thus it will be seen, that, when the plunger 27 is reciprocated by the air motor, the piston 26 moves forward and rearward in the bore 10, and thus draws lubricant from the bore 8, alternately, through the check valve 16 into the forward portion of the bore 10, and through the check valve 19 into the rearward portion of the bore 10. Forward motion of the piston 26, forces the lubricant trapped in the forward portion of the bore 10 through the check valve 17 into the bore 9. Rearward motion, of the piston 26, forces the lubricant which is trapped rearwardly of the piston through the check valve 18 into the bore 9.

Thus lubricant is being drawn from the bore 8 to the bore 10 continuously, whether the piston 26 is moving forward or rearward, and lubricant is being forced continuously from the bore 10 into the bore 9. The lubricant thus forced into the bore 9 will be forced out the forward or discharge end of said bore where it may be conducted through suitable means to the bearing or parts to be lubricated.

The air motor of the gun comprises a casing 32 formed with a relatively large central cylinder bore 33, in which there is disposed a piston 34, secured, as by means of nuts 35 and 36 to the plunger rod 27. The casing 32 is also provided with a pair of separated parallel bores 37 and 38, the latter forming a portion of the lubricant passageway 5, and connecting with the bore 8 of the pump A. The bore 37 forms a passage for air which is supplied to the cylinder 33 for driving the piston 34 during one cycle and for air which is exhausted from said cylinder during the alternate piston cycle.

For this purpose, the forward end of the bore 37 is connected, by a short lateral bore 40, with the cylinder 33, and at its rear end, is connected with an aligned bore 39 hereinafter described.

The rear end of the cylinder 33 is connected to a bore 41 through which air is supplied or exhausted to and from, the rear of the piston 34. As air is supplied through the bores 37 and 40, it is exhausted through the bore 41, and the piston 34 is moved in the direction of the arrow E. When air is supplied through the bore 41, it is exhausted through the bores 37 and 40, and the piston 34 is moved in the direction opposite to that of the arrow E.

A substantially cylindrical member 42 is associated with the automatic valve C, which, forms a casing therefor, and is formed with the parallel bores 39 and 41, and also, with a relatively large central bore 43. The forward end of the bore 43 is separated from the cylinder 33 by a plug 44, and suitable packing such as shown at 45 and 46. The rear end of the plunger rod 27 extends into the bore 43 passing through the plug 44 and packing 45 and 46. The rearward end of the plunger rod 27 has formed thereon, a pair of spaced flanges 47 and 48 provided for purposes hereinafter described.

Positioned in the bore 43, and surrounding the rod 27, is a valve member 49, which is slidably mounted relative to said bore 43 for the purpose of controlling the flow of air to, and from, the cylinder 33. The valve member 49 is formed with a longitudinal groove 51 extending throughout the length thereof so that an air passage is provided through said valve member. The upper part of the valve member 49 is provided with a relatively short longitudinal groove 52 which stops short of the front and rear ends thereof.

Surrounding the valve member 49, but positioned in the bore 43, is a cylindrical sleeve 54, within which the valve 49 is slidably disposed. The forward end of the sleeve 54 is formed with a shoulder 55 designed to limit the forward movement of the valve member 49 and the rear end of the sleeve 54 is provided with a cylinder 56, the forward end of which, forms a stop to limit the rearward movement of the valve member 49. The rear end of the cylinder 56 is formed with a port 57, and the cylinder 56 is secured to the sleeve 54 by means of a pin 58, or other suitable means. Through the lower part of the cylinder 56, and the sleeve 54, are formed aligned openings 61 and 62, which, in the position of the parts shown in Fig. 1, aligned with a bore 63, formed in the handle 2, and connected with the bore 4. The upper part of the sleeve 54 is formed with a slot 64 into which the end of a screw 65 secured in the member 42 protrudes.

The member 42 is formed with a transverse bore 66, connected with the longitudinal bore 41, and with a transverse bore 67, connected with the longitudinal bore 39. The sleeve 54 is formed with a pair of openings 68 and 69 aligned (in position of the parts shown in Fig. 1) with the bores 66 and 67 respectively. Interposed between the packing 46 and the sleeve 54, is a compression spring 71, which normally holds the sleeve 54 rearward of the position shown, but when the gun is in operation, the sleeve is manually held forward (as shown), and the spring 71 is held under compression.

The sleeve 54 is formed, on its lower side, with a slot 72 into which the upper end of a trigger 73 extends, and is also formed with a slot 74, into which a pin 75, secured in the casing 42, extends. The screws 65 and 75 thus serve to limit the forward and rearward movement of the sleeve 54, in the cylinder 56, and also serve to prevent the sleeve from rotating in the bore 43. The sleeve 54 is also formed with an exhaust port 76, which is (in the position shown), aligned with an exhaust port formed in the casing 42 so that air may be exhausted from the air motor.

In the normal, inoperative, position of the parts, the bores 61 and 62 are out of alignment with the bore 63, and the ports 68 and 69 are out of alignment with the bores 66 and 67 respectively. Thus air under pressure in the bore 4 is prevented from entering the casing 42 and the air motor B.

In operating the lubricant dispensing gun shown in Fig. 1, the trigger 73 is depressed, to the position shown in the drawings, and the sleeve 54 is thereby moved from its rearward position to the position illustrated, against the pressure of the spring 71. By reason of this movement, the ports 61 and 62 become aligned with the bore 63, and the ports 68 and 69 become aligned with the bores 66 and 67, respectively. Thus, air under pressure, may enter, from the bore 4, through the bore 63 and pass through the ports 61 and 62, into the interior of the sleeve 54. If the valve member 49 is in the position shown, the air passes forward through the groove 51, through the port 68 and the bores 66 and 41, into the cylinder 33 in rear of the piston 34, to urge the piston 34 forward in that direction opposite to the arrow E. Air in the cylinder 33, ahead of the piston 34, is forced out through the port 40, the bores 37, 39, 67, the port 69, the groove 52, the bore 76 and the aligned exhaust bore formed in the casing 42.

As the piston 34 approaches the forward end of the cylinder 33, the projection 48, on the plunger rod 27, comes into contact with the valve member 49 and moves it forward, until the front end thereof is stopped by the shoulder 55. Thereupon air under pressure is prevented from passing through the port 68 into the bore 66, but may pass through the port 69 into the bore 67, and thence through the bores 39, and 37, and the port 40 and into the front end of the cylinder 33. At the same time air, in the rear of the cylinder 33, may pass out through the bores 41, and 66 and the port 68, into the groove 52, and thence out through the bore 76.

When the piston 34 approaches the rear end of the cylinder 33, the projection 47, on the plunger 27, moves the valve member 49 rearwardly, to the position shown in Fig. 1, and the air flow is again reversed.

The movement of the piston 34 rearward and forward reciprocates the piston 26 and draws lubricant, as previously described, from the bore 3 through the lubricant passage 5 and the bore 8, and forces it out through the bore 9. Thus it may be seen that the air motor B is controlled by the automatic valve C so that the piston 26 is continuously reciprocated in the bore 10, and lubricant is continuously forced out through the bore 9, as long the the trigger 73 is depressed. However, as soon as the trigger 73 is released, the sleeve 54 is moved rearwardly by the spring 71, shutting off the air flow, and the reciprocation of the piston 26 is stopped.

In Fig. 2, I have shown, as an alternative construction, the cylinder 56a, retained in the sleeve 54a by a press fit. This construction is preferred, inasmuch as it is simpler and much more inexpensive to construct.

The gun shown in Fig. 3 is similar in many respects to the gun shown in Fig. 1. However, there are many structural differences, and by reason of the different structure of the control valve C, the gun may be made shorter and more compact. Moreover, a considerably different form of manual control for the inlet of air is provided. In the embodiment shown in Fig. 3, air under pressure enters through a bore 81 formed in the handle 2 and passes upward through said bore into a stepped transverse bore 82, said bore 82, having its rearward end closed by a plug 83 and connected, adjacent to its forward end, with a perpendicular bore 84. A valve seat 85 is provided in the bore 82, on which a valve member 86, having a stem 87, is adapted to seat. The stem 87 extends forward and is engaged with a trigger 88, by which the valve is controlled.

The bore 84 connects with a pair of bores 89 and 91, located, respectively, at the front and at the rear of a cylinder 92, which forms a part of the control valve assembly C. The cylinder 92 is secured in a longitudinal bore formed in the gun casing, intermediate the handle D and the air motor B. The rear end of the bore, and therefore, the rear end of the cylinder 92, is closed by a plug 93 and the space within the cylinder 92 is separated into a forward chamber and a rear chamber by means of a centrally located packing wall 94. That portion of the interior of the cylinder 92 to the left of the wall 94 is vented to atmosphere by one or more bleeder valves, and that portion to the right of the wall 94 is similarly vented. Preferably I provide on each side one bleeder valve adjacent to the wall 94 and one or more valves spaced therefrom.

Mounted in the cylinder 92, in the forward chamber, and in the rear chamber, respectively, are a pair of valve members 95 and 96. These valve members 95 and 96 are rigidly interconnected by a rod 97 which passes through a central opening in the packing wall 94. The valve members 95 and 96 are formed with longitudinal grooves 98 and 99, respectively, neither of which grooves extend to either end of said valve members.

The air motor B is located above the valve assembly C, and includes a cylinder 101 having its front and rear ends connected, respectively, with the front and rear ends of the cylinder 92 by means of passages or ports 102 and 103. Furthermore, the cylinder 101 is connected adjacent to its central portion, by means of a pair of ports 104 and 105, with the cylinder 92 at points adjacent the front of the wall 94 and the rear of the wall, respectively. The cylinder 101 is closed at its rear end by a plug 106.

Positioned within the cylinder 101, is a relatively thick piston 107 which forms a part of the air motor. Secured to the piston 107 and extending forward therefrom, through suitable packing, is a plunger rod 108 which carries, intermediate its end, a piston 109. The piston 109 is positioned in and adapted to reciprocate in a bore 111 formed in the pump portion A of the gun and the forward end of the rod 108 extends into a smaller bore 112 aligned with the bore 111. Packings 113 and 114 surround the front end of the rod 108 adjacent the point at which it enters the bore 112, to form a lubricant tight joint.

Secured to the lower part of the handle, is a lubricant conduit 115, which is inclined forwardly and connected with a longitudinal bore 116 formed in the lower part of the pump section A of the gun. The bore 116 has its forward end closed by a plug 117, and is connected by transverse bores 118 and 119 with the front and rear ends, respectively, of the bore 111. The front and rear ends of the bore 111 are also connected by transverse passages 121 and 122 with a longitudinal bore 123 formed in the upper part of the pump section A of the gun.

Positioned in the passages 118 and 119, are check valves 124 and 125, each comprising a cage and a ball check, and positioned in the passages 121 and 122 are check valves comprising cages 128 and 129, ball checks 131 and 132, and springs 133 and 134 respectively. The upper ends of the springs 133 and 134 bear on plugs 135 and 136 and are held in position by projections 137 and 138 formed on said plugs, respectively.

In the operation of this embodiment of my invention, air under pressure enters through the bore 81, and if the trigger 88 is depressed (as shown), passes through the bores 82 and 84, and the bores 89 and 91. If the valve members 95 and 96 are in the position shown in the figure, the air passes from the bore 91 through the passage 103 into the rear part of the cylinder 101. This condition will cause the piston 107 to be forced forwardly, thus moving the piston 109 forward thus drawing lubricant through the conduit 115, the bore 116, the passage 119, into the interior of the bore 111. At the same time the forward movement of the piston 109 will force lubricant out through the bore 121, into the bore 123, and into the fitting or bearing to be lubricated. The lubricant pressure will cause the ball 126 to press against its seat and prevent the return of lubricant into the bore 116. As soon as the piston 107 reaches a point adjacent to its forward position, it will uncover the passage 105 and thus allow air under pressure to enter the cylinder 92 at the rear of the wall 94, but ahead of the valve member 96.

By reason of the fact that two, or more, bleeder valves are provided in each chamber, a cushioning effect is obtained in moving the valve members 96 and 95. However, the bleeder valves provided for the chamber to the left of the partition 94, allow the air therein to escape, and inasmuch as air under pressure is flowing in fairly heavy volume into the opposite side of the partition through the passage 105, the valve members 96 and 95 are forced suddenly to the right from the position shown in Fig. 3, and thus air under pressure which is flowing in through the bores 81, 82, 84, and 91 is prevented from passing in through the port 103, but is allowed to pass into the cylinder 101 by the bores 81, 82, 84, and 89, and the port 102. This causes a movement of the piston 107 to the right (looking at Fig. 3) and therefore causes the piston 109 also to move to the right.

This movement of the piston 109 forces lubricant out through the bores 122 and 123 into the part to be lubricated, the lubricant being prevented from passing downward by reason of the ball check valve in the bore 119, but being allowed to pass upward past the ball valve 132. At the same time a relatively lower pressure is created in front of the piston 109 and lubricant is drawn in from the bore 116 and the conduit 115 past the ball check valve 126.

It is to be noted that the valve members 96 and 95 are formed with flat portions 139 and 141. By reason of these flat portions the members are maintained by air pressure continuously in the upper part of the cylinder 92 and thus leakage of air through the passages 102 and 103 is prevented except when the passage of air through the passages is desired. The flat portion 139 also serves to aid in guiding the members 95 and 96 and in preventing the members from rotating. There is provided in the cylinder 92, a pin 142, which contacts with the flat portion 139 and prevents the members 95 and 96 from turning in the cylinder 92.

In Fig. 4 I have shown a modified form of the valve structure C wherein the members 95a and 96a and the rod 97a are formed integrally and the packing wall 94 is replaced by a packing 94a formed by casting babbitt metal, or other suitable bearing metal about the rod 97a. Or if desired, the packing 94a may be constructed by wrapping copper or bronze strip about the rod 97a. However, in either structure it is necessary, of course, that the rod 97a be free to reciprocate through the packing 94a. The packing 94a is secured within a single sleeve 92a as by the annular indentation of the walls of the sleeve 92a inwardly to engage the periphery of the packing 94a as shown at 92b. Thus the entire valve assembly may be placed within the cylindrical valve receiving bore of the gun body in the plug 93 screwed in place to close the end of the bore hence the end of the sleeve 92a of the valve assembly. The advantage of this construction is twofold, that of providing a unit valve assembly, a valve wherein the two piston or valve elements are formed of a similar piece of steel stock and therefore maintained in permanent operative relationship with one another. The cost of construction and labor involved in assembly is also minimized.

In Figs. 5, 6, and 7 I have shown a modified form of gun similar in many respects to that shown in Fig. 3. In view of this similarity, only parts which differ materially will be explained in detail, and like parts will be designated by like reference numerals. The lubricant pump A, the air motor B, and the manual control valve D are substantially the same as those of the device illustrated in Fig. 3. However, the automatic valve C differs considerably from the automatic valve C shown in Fig. 3. Referring particularly to Fig. 7 of the drawings, it will be seen that the bottom of the casing adjacent to the motor B is provided with a longitudinal bore 151 in which there is inserted a cylindrical casing 152, provided with packings 153 and 154 at the ends thereof, and held securely in place by a plug 155. Slidably mounted in the casing 152, is a single valve member 156 formed with a flattened portion 157 extending throughout a part of the length of the valve member, but not extending to either end thereof. Said valve member 156 is also provided with a groove 158, recessed in the flat portion to receive a positioning screw 159 which is adapted to extend into said recess to maintain the valve member in its proper rotative position. Extending longitudinally of the valve member, and aligned with each other, but not positioned concentrically with the valve member, are a pair of bores 161 and 162. These bores extend to each end of the valve member, but do not extend to the center thereof, their inner ends being joined to a pair of transverse bores 163 and 164 respectively. Spaced outwardly from the bores 163 and 164 are a pair of diametrically disposed transverse bores 165 and 166 so arranged that they do not intersect at any point with the longitudinal bores 161 and 162. Still further, outwardly, spaced from the bores 165 and 166, are a pair of offset transverse slots 167 and 168, extending from the top of the valve member to one side thereof, but so arranged that they do not intersect, at any point, the longitudinal bores 161 and 162.

The casing 152 is formed with an opening leading to a bore 169 formed in the body of the gun, and shown in Figs. 5 and 6, as well as in Fig. 7, and is provided with a pair of outlet ports 173 and 174 adapted to be, at times, connected with the slots 167 and 168. The casing is also formed with a pair of bleeder openings 171 and 172, and with a pair of ports 175 and 176 connected with air inlet passages 177 and 178. Moreover, it is formed with openings 181 and 182 aligned with passages 183 and 184, and adapted, at times, to be aligned with bores 164 and 163.

The operation of the automatic valve C shown in Fig. 7 is somewhat similar to the operation of the automatic valve C shown in Fig. 3. Air under pressure enters the gun through the bore 81 and passes through the bores 82 and 169 into the interior of the cylinder 152. If the cylinder is in the position shown in Fig. 7, the air then passes through the bore 166, the opening 175, and the passage 177, into the cylinder 101. Thereafter the air acts upon the piston 107, to force it to the left, as shown in Fig. 7, and thus operates the lubricant pump A. The air in the cylinder 101, to the left of the piston 107, escapes through ports 178 and 176, through slot 167, and through port 173. When the piston 107 approaches the left portion of the cylinder 101, it uncovers the passage 184 and air under pressure is forced through the bores 164 and 162 into the right end of the cylinder 152. Inasmuch as the high pressure in the left end of the cylinder 152 has been dissipated through the bleeder valve 171, the high pressure built up in the right end thereof, forces the valve member 156 to the left, until the stop 185 comes into contact with the end of the cylinder. Thereupon, the bore 166 has been moved out of alignment with the passage 177 so that no more air is forced into the right end of the cylinder 101, but air is forced through the bore 165 and the passageway 178 into the left hand end of the cylinder 101. Moreover, the slot 167 has been moved out of alignment with the passage 178 so that no more air may be exhausted from the left end of the cylinder 101 through the opening 173.

However, air may be exhausted from the right end of the cylinder 101 through the passage 177, the slot 168, and the port 174. Thus the air under pressure acts upon the piston 107 to force it to the right, and the lubricant pump A is again operated as previously described. When the piston 107 approaches the right end of the cylinder 101, the passage 183 is uncovered and air under pressure is forced through said passage, through the bores 163 and 161, into the left end of the cylinder 152, and the valve member 156 is forced to the right, to the position shown in Fig. 7. Thereafter, the operation is repeated continuously so that lubricant is forced continuously from the pump. This action is continuous as long as the trigger throttle control is depressed.

It is to be understood that the above described embodiments of the invention are for the purpose of illustration only, and various changes may be made therein without departing from the spirit and scope of the invention.

I claim:

1. A portable lubricant gun comprising a lubricant feeder pump having a piston, an air motor for operating said piston, and an automatic valve for actuating said air motor and means for admitting air under pressure to said automatic valve to operate the same, said air being at a lower pressure than that employed to operate said air motor.

2. A lubricating device comprising, a lubricant feeder pump, a double action piston forming a part of said pump, operating means for said pump including a double action air piston of greater displacement than said pump piston, a control valve for controlling air admission to and exhaust from both sides of said air piston, and a rod connecting said lubricant piston to said air piston and mechanically associated with said control valve through a non-resilient lost motion connection, said pistons and said valve all being positioned upon a common axis.

3. A lubricant gun comprising a feeder pump, including a double-acting piston arranged to deliver lubricant under pressure during each half cycle of its reciprocatory travel, an air motor having a motivating means coupled to said piston for operating said piston, an automatic exhaust air operated valve for controlling the operation of said air motor, means for supplying air to said valve from said air motor, and a trigger operated throttle valve for controlling said motor.

4. A lubricant gun comprising a feeder pump including a piston, an air motor, having a reciprocatory element directly coupled to said piston, an automatic positively drawn valve coupled to said reciprocating element by lost motion means for controlling the operation of said air motor, and a manually operated throttle for controlling said air motor, said throttle including a valve sleeve surrounding said automatic valve.

5. A lubricant gun comprising a feeder pump, including a piston, an air motor having a reciprocatory element directly coupled to said piston, an automatic double action valve for controlling the operation of said air motor, operated by exhaust air from said motor at each half cycle of motor operation, means for supplying exhaust air from said motor to said valve, and a manually operated throttle for controlling said air motor.

6. A lubricant gun comprising a feeder pump, including a piston, an air motor having a reciprocatory element directly coupled to said piston, an automatic valve operated by exhaust air from said motor, means for supplying exhaust air from said motor to said valve for actuating said valve, and a manually operated throttle for controlling said air motor, said gun including a pistol hand grip, and a trigger adjacent thereto for operating said throttle.

7. In a lubrication device, a high pressure lubricant feeder pump having a piston, an air motor for operating said pump, a manually operated valve sleeve for controlling said air motor, and an automatic valve for controlling the operation of said air motor, said valve including a valve member slidably mounted in said valve sleeve and adapted to move at the end of each half cycle of the operation of said air motor and to remain stationary with its inlet and delivery ports at maximum opening during substantially the entire stroke of said pump piston.

8. In a lubrication device including a double-action lubricant feeder pump and an air motor for operating said pump, an automatic valve for actuating said air motor comprising, a cylinder having air ports therein, a valve member slidably mounted in said cylinder, operable at the end of each half cycle of operation of said pump, and means for admitting exhaust air from said motor to said cylinder to move said valve member therein to cover certain of said ports and to uncover others.

9. In a lubrication device, a double action positive feed lubricant pump for withdrawing lubricant from a source of lubricant supply and discharging it under pressure, an air operated motor for driving said pump in both directions, a double action valve for controlling said air motor, a pistol hand grip by which said device may be manually supported, and a trigger for actuating said valve, mounted adjacent to said hand grip.

10. A lubrication device comprising a lubricant feeder pump, a double action piston forming a part of said pump and ejecting a charge of lubricant at each stroke in each direction, operating means for said pump including a double action air piston, a control valve for said air piston, and a rod connecting said lubricant piston to said air piston and mechanically associated with said control valve through a lost motion connection, said pistons and said valve all being positioned upon a common axis.

11. In a lubricant feeder gun, an air motor having a piston operated by air pressure, an air valve for controlling said air motor piston comprising a valve casing, a tubular member inserted in said casing, a partition in said tubular member, a movable element comprising a pair of valve members one on each side of said partition slidably disposed in said tubular member and joined by an integral reduced portion extending through said partition, and means for selectively introducing air into said tubular member on opposite sides of said partition for shifting said valve members.

ADIEL Y. DODGE.